US012604948B1

(12) United States Patent
Boscio

(10) Patent No.: US 12,604,948 B1
(45) Date of Patent: Apr. 21, 2026

(54) PERSONAL SECURITY DEVICE AND ASSOCIATED METHOD(S)

(71) Applicant: Dina Boscio, Jacksonville, FL (US)

(72) Inventor: Dina Boscio, Jacksonville, FL (US)

( * ) Notice: Subject to any disclaimer, the term of this patent is extended or adjusted under 35 U.S.C. 154(b) by 177 days.

(21) Appl. No.: 18/742,071

(22) Filed: Jun. 13, 2024

Related U.S. Application Data

(60) Provisional application No. 63/507,911, filed on Jun. 13, 2023.

(51) Int. Cl.
*A44C 5/00* (2006.01)
*B26B 11/00* (2006.01)

(52) U.S. Cl.
CPC ............ *A44C 5/0007* (2013.01); *B26B 11/00* (2013.01)

(58) Field of Classification Search
CPC .............................. A44C 5/0007; B26B 11/00
See application file for complete search history.

(56) References Cited

U.S. PATENT DOCUMENTS

| | | | | | |
|---|---|---|---|---|---|
| 2,189,096 | A * | 2/1940 | Alonge | G04B 37/12 | 63/29.1 |
| 4,055,057 | A * | 10/1977 | Kolman | A44C 5/2014 | 63/7 |
| 4,236,384 | A * | 12/1980 | Daub | A44C 5/2076 | 63/7 |
| 5,358,144 | A * | 10/1994 | Mock | F41H 9/10 | 222/39 |
| 8,322,586 | B2 * | 12/2012 | Davis | B26B 3/06 | 224/232 |
| 8,935,940 | B1 * | 1/2015 | Lough | A44C 5/0038 | 63/3.1 |
| 9,986,795 | B2 * | 6/2018 | Bloch | A44C 5/0061 | |
| 9,999,279 | B2 * | 6/2018 | Bloch | A45D 29/04 | |
| D889,235 | S * | 7/2020 | Bloch | D8/98 | |
| D947,706 | S * | 4/2022 | Piazza | D11/5 | |
| 11,766,790 | B1 * | 9/2023 | Price | B26B 1/04 | 30/136 |
| 2010/0050690 | A1 * | 3/2010 | Woodward | A44C 5/0007 | 44/507 |
| 2012/0212339 | A1 * | 8/2012 | Goldblatt | G08B 25/016 | 340/539.11 |
| 2014/0109615 | A1 * | 4/2014 | Millan | B26B 11/00 | 63/1.12 |
| 2014/0130543 | A1 * | 5/2014 | Demmer | A44C 15/003 | 29/896.41 |
| 2015/0239134 | A1 * | 8/2015 | Duey | B26B 1/06 | 30/159 |
| 2017/0340070 | A1 * | 11/2017 | Bloch | A44C 15/0015 | |
| 2018/0154531 | A1 * | 6/2018 | Caswell | B26B 1/10 | |
| 2018/0271230 | A1 * | 9/2018 | Fahy | D06H 7/00 | |
| 2019/0134830 | A1 * | 5/2019 | Levine | B26B 11/008 | |
| 2021/0169204 | A1 * | 6/2021 | Key | A45F 5/00 | |

* cited by examiner

*Primary Examiner* — Sean M Michalski
(74) *Attorney, Agent, or Firm* — Ashkan Najafi

(57) ABSTRACT

A personal security service (PSD) includes a bracelet, a housing having a mechanism configured to adjustably receive and anchor the bracelet configured to be worn on a user wrist, and a blade being pivotally coupled to the mechanism and being spaced from the bracelet. A distal end of the blade selectively and detachably locks the mechanism at a desired configuration such that the bracelet is securely anchored to the housing.

20 Claims, 6 Drawing Sheets

PERSONAL SECURITY DEVICE AND ASSOCIATED METHOD(S)

CROSS REFERENCE TO RELATED APPLICATIONS

This is a non-provisional patent application that claims priority to and benefit of U.S. provisional patent application No. 63/507,911, filed Jun. 13, 2023, which is incorporated by reference herein in its entirety.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND

Technical Field

Exemplary embodiment(s) of the present disclosure relate to personal security devices and, more particularly, to a specially configured personal security service (PSD) including a mini keychain knife and a mechanism to adjustably receive a bracelet configured to be worn on a user wrist.

Prior Art

Often times it is desirable to keep a personal security device on one's person so that the device is typically always on hand should the need to use the device arise. For example, pocket knives and small, folding multi-blade units can be carried in a pocket and/or attached to a key chain. However, these devices can be bulky and uncomfortable to carry in a pocket. Moreover, the usefulness of pocket-style tool systems is limited since items that are required to be separately placed in a pocket are often forgotten, users may not always have clothing with pockets, and items can often inadvertently fall out of pockets.

There have been attempts to provide wearable security devices, such as in the form of bracelets. However, certain wearable devices are provided as rigid linkages similar to a metal watch band that incorporate security features. These types of tools that can be incorporated are limited since they are limited by the size of each individual linkage. Moreover, the number of tools that can be incorporated is limited because there are a limited number of linkages that can fit around a user's wrist. In addition, these linkages can be difficult to remove and/or replace, thereby further limiting the versatility of these devices. The links of the full metal bracelet are relatively large and wide, which creates issues with respect to weight and comfort for the wearer. In addition, similar competitive devices on the market are knife-centric and are hunter style-knives utilizing a disconnecting knife blade.

Accordingly, a need remains for a personal security service (PSD) in order to overcome at least one of the above-noted shortcomings. The exemplary embodiment(s) satisfy such a need by a specially configured personal security service (PSD) including a mini keychain knife that is convenient and easy to use, lightweight yet durable in design, versatile in its applications, and configured to employ a mechanism to adjustably receive a bracelet configured to be worn on a user wrist.

BRIEF SUMMARY OF NON-LIMITING EXEMPLARY EMBODIMENT(S) OF THE PRESENT DISCLOSURE

In view of the foregoing background, it is therefore an object of the non-limiting exemplary embodiment(s) to provide a specially configured personal security service (PSD) including a mini keychain knife and a mechanism to adjustably receive a bracelet configured to be worn on a user wrist. These and other objects, features, and advantages of the non-limiting exemplary embodiment(s) are provided by a personal security service (PSD) including a bracelet, a housing having a circle shape and including a mechanism configured to adjustably receive and anchor the bracelet configured to be worn on a user wrist, and a blade being pivotally coupled to the mechanism and being spaced from the bracelet. Advantageously, a distal end of the blade selectively and detachably locks the mechanism at a desired configuration such that the bracelet is securely anchored to the housing.

In a non-limiting exemplary embodiment, the mechanism includes a circular track being extended along an entire circumferential length of the housing, a plurality of stabilizers being selectively positioned along the track and the circumferential length of the housing, and a stationary first post being disposed at a fixed location along the circumferential length of the housing.

In a non-limiting exemplary embodiment, the mechanism further includes a dynamic second post being selectively disposed along the circumferential length of the housing and being intercalated between the stabilizers.

In a non-limiting exemplary embodiment, the bracelet is removably attached to the stationary first post and the dynamic second post.

In a non-limiting exemplary embodiment, the stabilizers include a plurality of deformably resilient members that are spheric rubber balls.

In a non-limiting exemplary embodiment, the housing has a bifurcated shape including a top half and a bottom half spaced therefrom such that the track is disposed between the top half and the bottom half. The top half has a plurality of top apertures equidistantly spaced along a first circumference thereof, and the bottom half has a plurality of bottom apertures equidistantly spaced along a second circumference thereof. Advantageously, the top apertures are vertically aligned with the bottom apertures, respectively. Advantageously, the top half has an arcuate indentation being extended radially inwardly from an outer circumferential edge of the top half. A plurality of fasteners are intercalated between the top apertures and bottom apertures wherein one of the fasteners passes through a proximal end of the blade. The housing has an inner opening configured to receive a user wrist therethrough.

In a non-limiting exemplary embodiment, the blade has a curvilinear shape and is provided with a finger being protruded orthogonally away therefrom and further being abutted against the housing. Such a finger is rectilinear, oriented parallel to the fasteners, and is frictionally engaged with the arcuate indentation of the top half when the blade is articulated to a closed position. Advantageously, the distal end of the blade has a notch configured to frictionally engage the dynamic second post when the blade is articulated to the closed position such that the dynamic second post is locked. Notably, the blade is intercalated between the top half and the bottom half.

In a non-limiting exemplary embodiment, the dynamic second post is slidably reciprocated along a bi-directional arcuate travel path extended along the track and the circumferential length of the housing.

In a non-limiting exemplary embodiment, the bracelet is connected to both the static first post and the dynamic second post, wherein the spheric rubber balls are frictionally fit within the track and along the circumferential length of the housing, wherein the blade has a curvilinear shape and is provided with a sharp blade being protruded orthogonally away therefrom and further being abutted against the housing, wherein the static first post is diametrically opposed from the dynamic second post, wherein the static first post is coextensively shaped as the dynamic second post.

There has thus been outlined, rather broadly, the more important features of non-limiting exemplary embodiment (s) of the present disclosure so that the following detailed description may be better understood, and that the present contribution to the relevant art(s) may be better appreciated. There are additional features of the non-limiting exemplary embodiment(s) of the present disclosure that will be described hereinafter and which will form the subject matter of the claims appended hereto.

BRIEF DESCRIPTION OF THE NON-LIMITING EXEMPLARY DRAWINGS

The novel features believed to be characteristic of non-limiting exemplary embodiment(s) of the present disclosure are set forth with particularity in the appended claims. The non-limiting exemplary embodiment(s) of the present disclosure itself, however, both as to its organization and method of operation, together with further objects and advantages thereof, may best be understood by reference to the following description taken in connection with the accompanying drawings in which:

Figure 1:
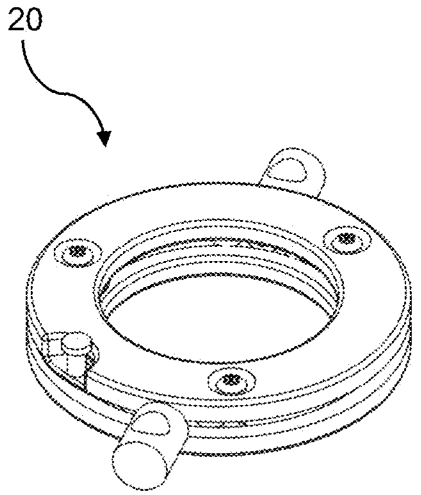
FIG. 1 is a perspective view of a personal security device (PSD) at a closed position, in accordance with a non-limiting exemplary embodiment of the present disclosure.

Those skilled in the art will appreciate that the figures are not intended to be drawn to any particular scale; nor are the figures intended to illustrate every non-limiting exemplary embodiment(s) of the present disclosure. The present disclosure is not limited to any particular non-limiting exemplary embodiment(s) depicted in the figures nor the shapes, relative sizes or proportions shown in the figures.

DETAILED DESCRIPTION OF NON-LIMITING EXEMPLARY EMBODIMENT(S) OF THE PRESENT DISCLOSURE

The present disclosure will now be described more fully hereinafter with reference to the accompanying drawings, in which non-limiting exemplary embodiment(s) of the present disclosure is shown. The present disclosure may, however, be embodied in many different forms and should not be construed as limited to the non-limiting exemplary embodiment(s) set forth herein. Rather, such non-limiting exemplary embodiment(s) are provided so that this application will be thorough and complete, and will fully convey the true spirit and scope of the present disclosure to those skilled in the relevant art(s). Like numbers refer to like elements throughout the figures.

The illustrations of the non-limiting exemplary embodiment(s) described herein are intended to provide a general understanding of the structure of the present disclosure. The illustrations are not intended to serve as a complete description of all of the elements and features of the structures, systems and/or methods described herein. Other non-limiting exemplary embodiment(s) may be apparent to those of ordinary skill in the relevant art(s) upon reviewing the disclosure. Other non-limiting exemplary embodiment(s) may be utilized and derived from the disclosure such that structural, logical substitutions and changes may be made without departing from the true spirit and scope of the present disclosure. Additionally, the illustrations are merely representational and are to be regarded as illustrative rather than restrictive.

One or more embodiment(s) of the disclosure may be referred to herein, individually and/or collectively, by the term "non-limiting exemplary embodiment(s)" merely for convenience and without intending to voluntarily limit the true spirit and scope of this application to any particular non-limiting exemplary embodiment(s) or inventive concept. Moreover, although specific embodiment(s) have been illustrated and described herein, it should be appreciated that any subsequent arrangement designed to achieve the same or similar purpose may be substituted for the specific embodiment(s) shown. This disclosure is intended to cover any and all subsequent adaptations or variations of other embodiment(s). Combinations of the above embodiment(s), and other embodiment(s) not specifically described herein, will be apparent to those of skill in the relevant art(s) upon reviewing the description.

References in the specification to "one embodiment(s)", "an embodiment(s)", "a preferred embodiment(s)", "an alternative embodiment(s)" and similar phrases mean that a particular feature, structure, or characteristic described in connection with the embodiment(s) is included in at least an embodiment(s) of the non-limiting exemplary embodiment(s). The appearances of the phrase "non-limiting exemplary embodiment" in various places in the specification are not necessarily all meant to refer to the same embodiment(s).

Directional and/or relationary terms such as, but not limited to, left, right, nadir, apex, top, bottom, vertical, horizontal, back, front and lateral are relative to each other and are dependent on the specific orientation of an applicable element or article, and are used accordingly to aid in the description of the various embodiment(s) and are not necessarily intended to be construed as limiting.

If used herein, “about,” “generally,” and “approximately” mean nearly and in the context of a numerical value or range set forth means±15% of the numerical.

If used herein, “substantially” means largely if not wholly that which is specified but so close that the difference is insignificant.

Figure 2:
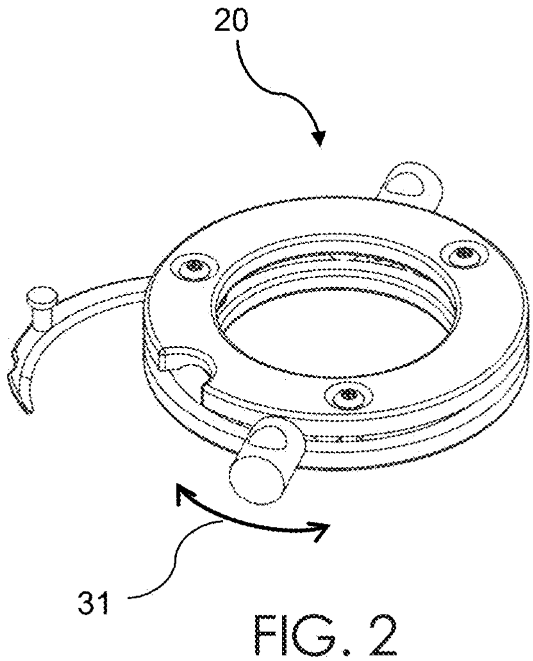
FIG. 2 is a perspective view of the PSD with a sharp blade articulated to an open position.
Figure 3:
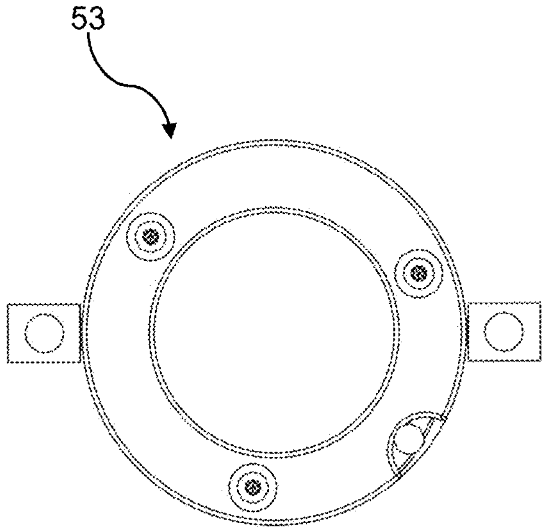
FIG. 3 is a top plan view of the PSD shown in FIG. 1.
Figure 4:
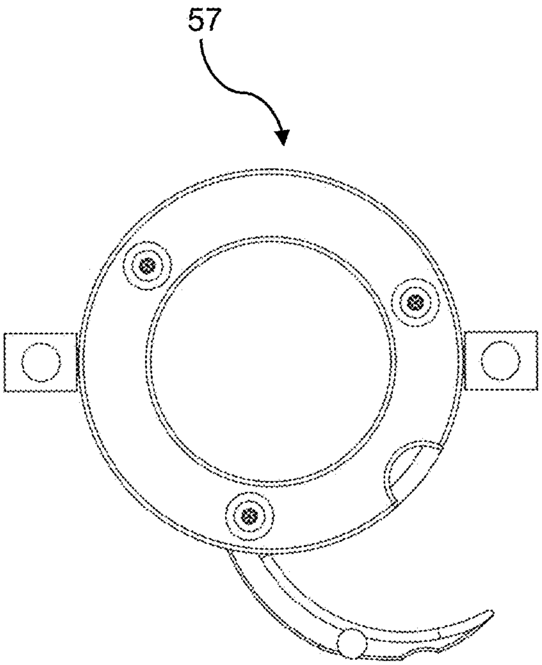
FIG. 4 is a top plan view of the PSD shown in FIG. 2.
Figure 5:
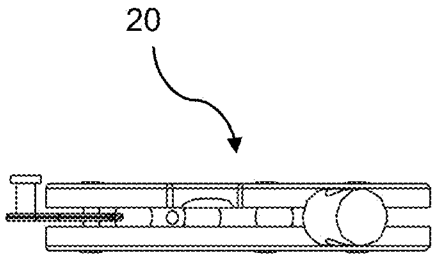
FIG. 5 is a rear elevational view of the PSD shown in FIG. 2.
Figure 6:
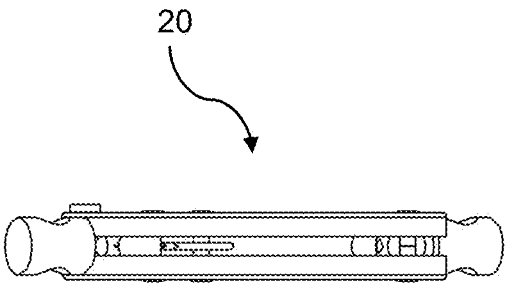
FIG. 6 is a side elevational view of the PSD shown in FIG. 2.
Figure 7:
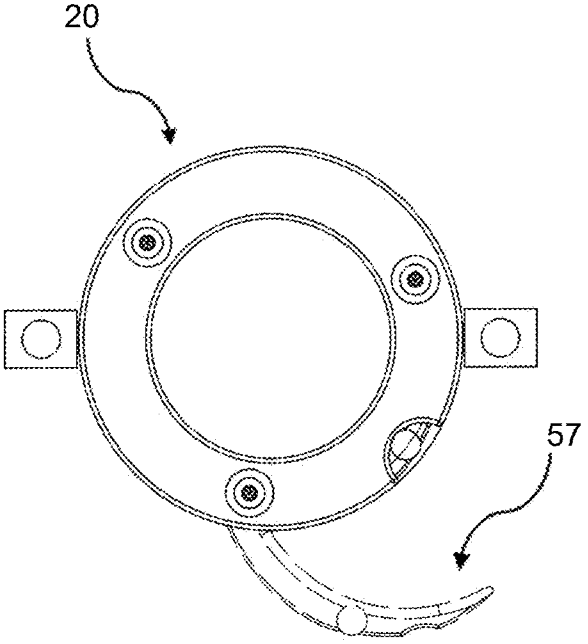
FIG. 7 is another top plan view of the PSD showing movement of the sharp blade.
Figure 8:
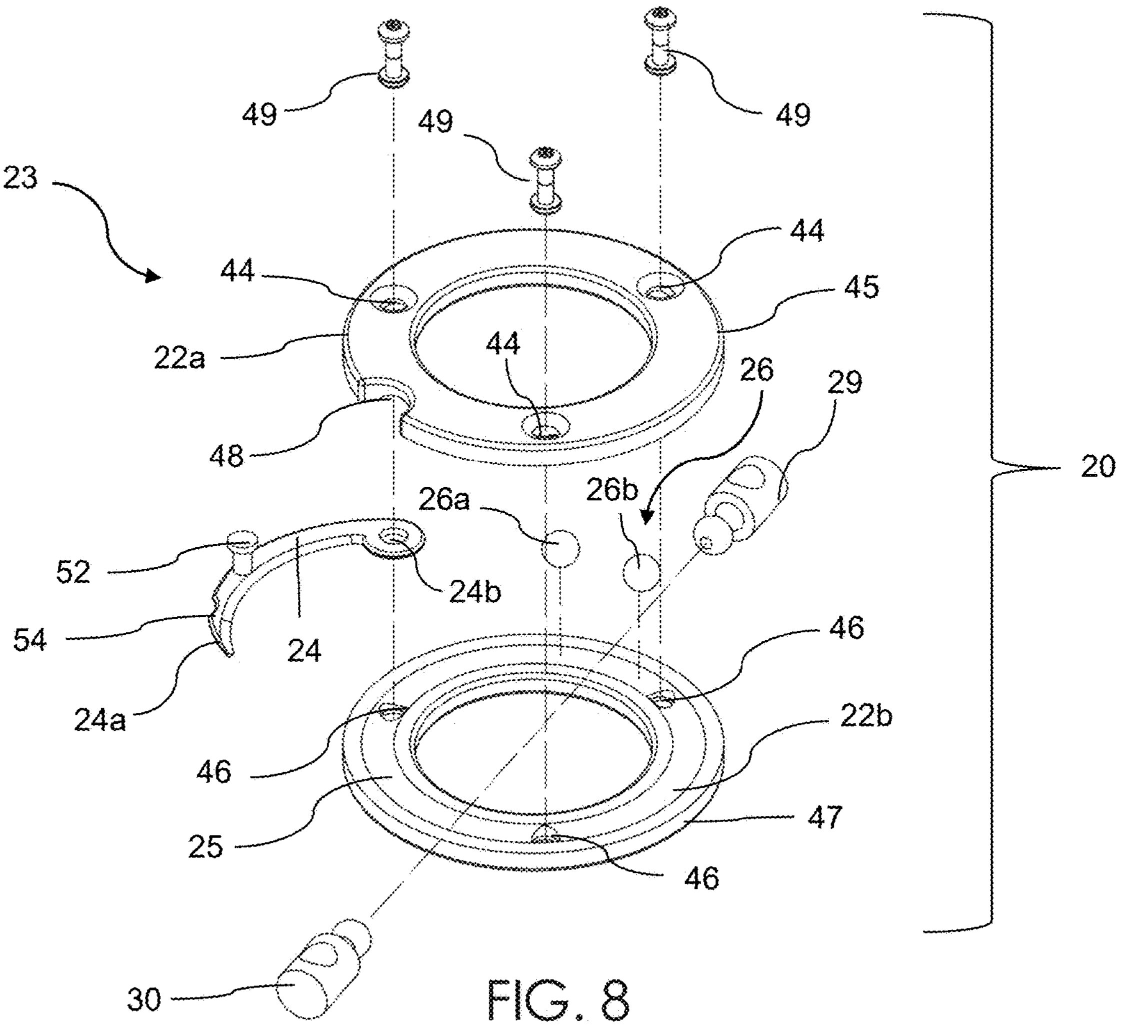
FIG. 8 is an exploded view of the PSD shown in FIG. 1.
Figure 9:
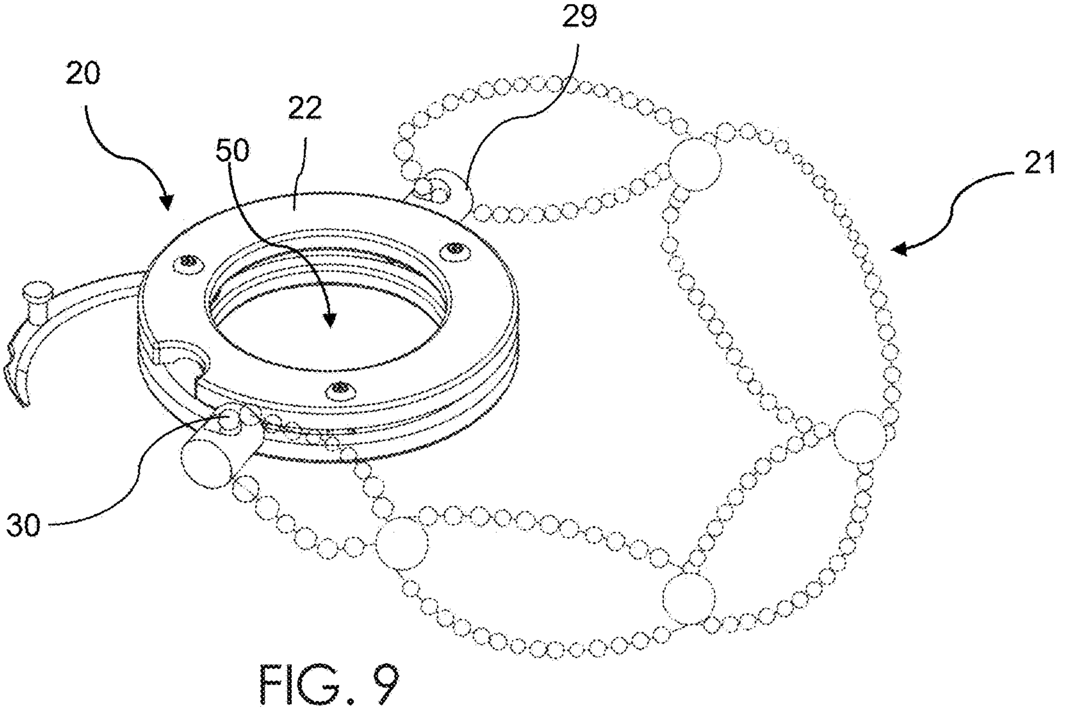
FIG. 9 is a perspective view of the PSD shown in FIG. 2 with a bracelet adjustable affixed thereto.
Figure 10:
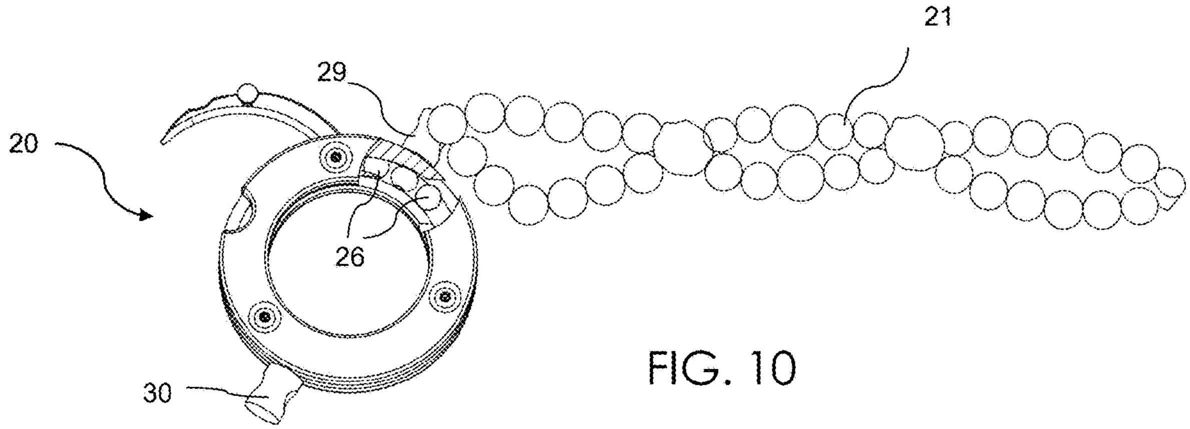
FIG. 10 is a partially transparent view of the PSD showing the stabilizers positioned at opposite sides of a post.
Figure 11:
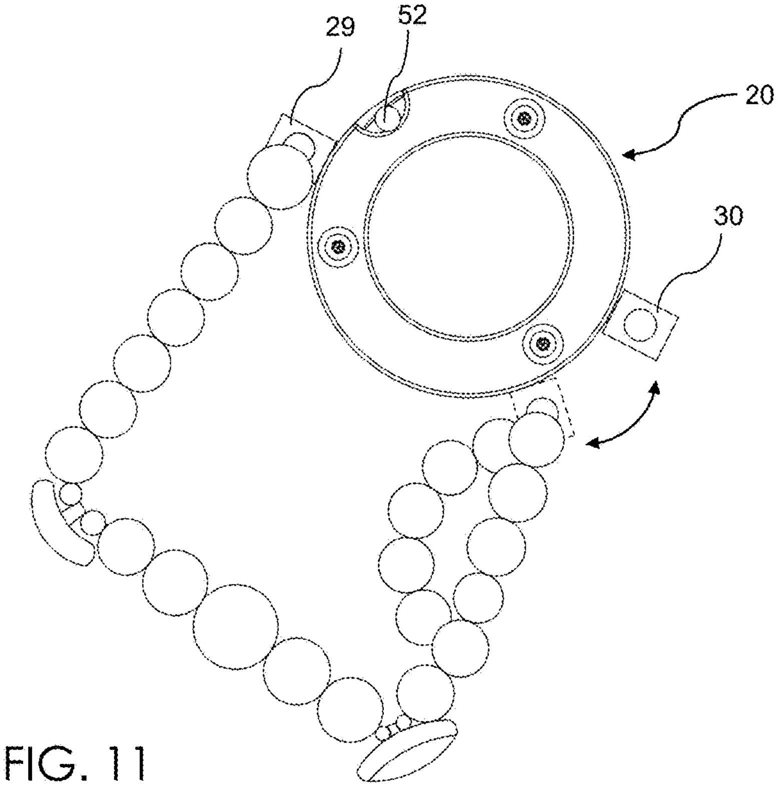
FIG. 11 is another top plan view of the PSD showing rotational movement of a post along the housing.
Figure 12:
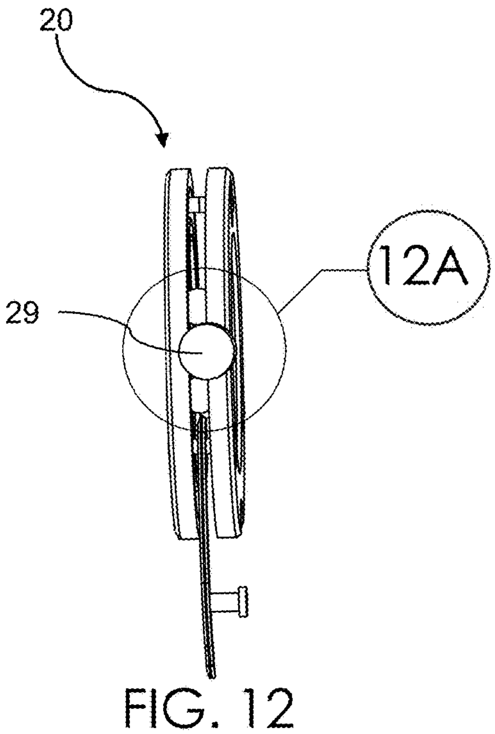
FIG. 12 is a side elevational view showing a position of a post relative to the two stabilizers.
Figure 12A:
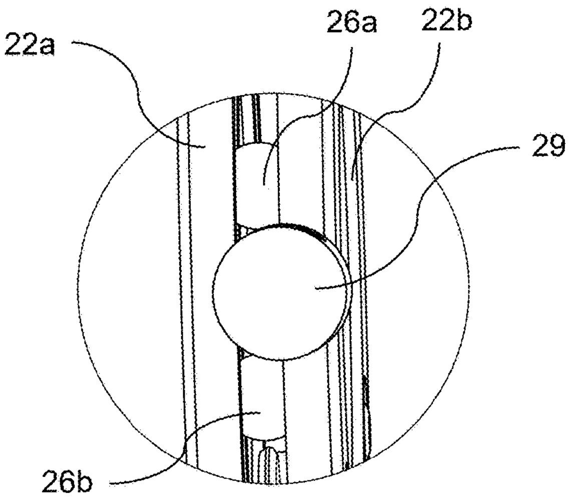
FIG. 12A is an enlarged view of section 12A taken in FIG. 12.
Figure 13:
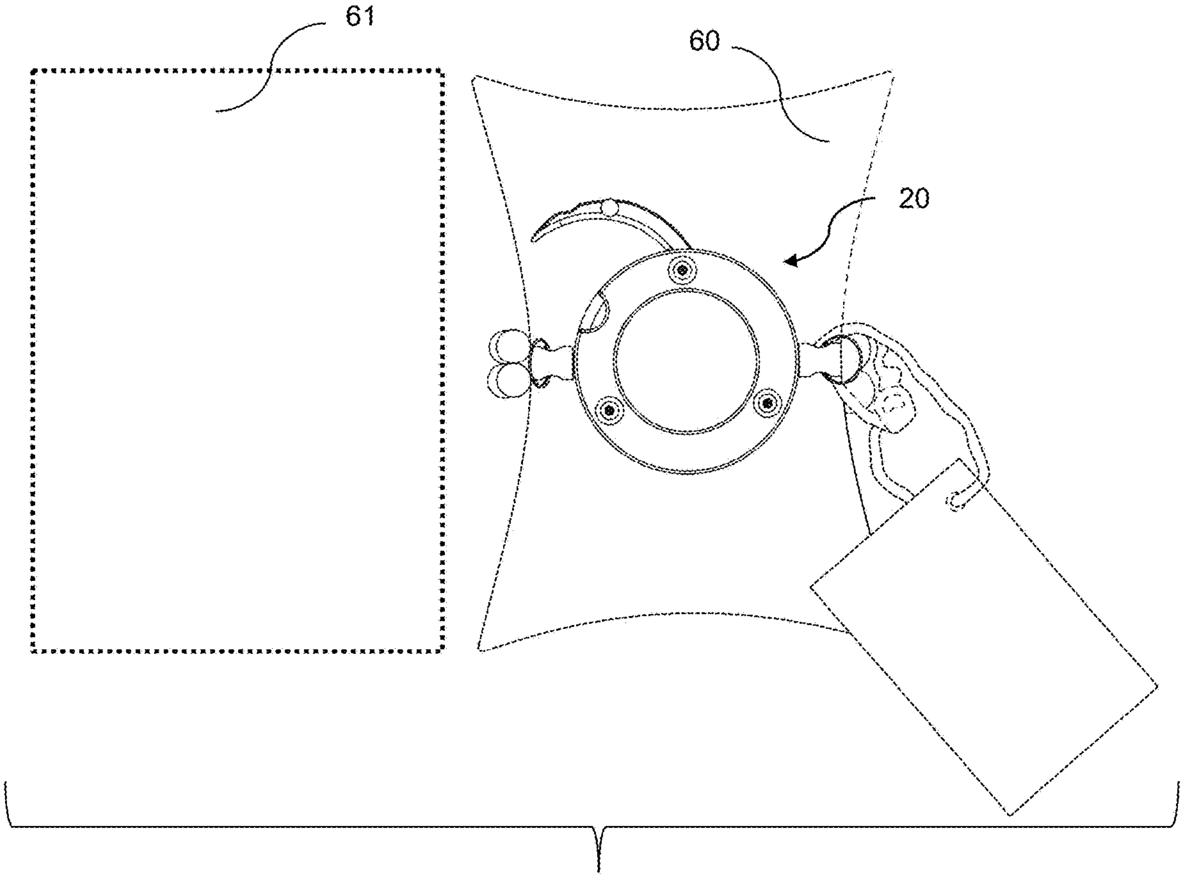
FIG. 13 is a top plan view showing the PSD attached to a cushion located next to a dust cover.

The non-limiting exemplary embodiment(s) is/are referred to generally in FIGS. 1-13 and is/are intended to provide a specially configured personal security service (PSD 20) including a mini keychain knife (blade 24) and a mechanism 23 to adjustably receive a bracelet 21 configured to be worn on a user wrist. It should be understood that the exemplary embodiment(s) may be used to by a variety of users, and should not be limited to any particular user described herein.

Referring to FIGS. 1-13 in general, in a non-limiting exemplary embodiment(s), the PSD 20 is made into a bracelet assembly by securing a bracelet first post 29 into a stationary position via rubber stabilizers 26 (e.g., resilient rubber spheres). Thus, the PSD 20 can be removably worn on the user wrist. The PSD 20 includes bracelet 21 and becomes part of the jewelry. The PSD 20 has a housing 22 provided with a succinctly actuated knife (blade 24) that swings to an open position 57 from a closed position 53. The rubber stabilizers 26 (e.g., resilient rubber spheres) allow interchangeable bracelets 21 to adjustably connect to the housing 22 of the PSD 20.

A non-limiting exemplary embodiment(s), by turning the mini knife (blade 24) into a PSD 20, it can be worn on the user wrist for quick and discrete release. Selectively locking the post(s) 29, 30 enables the PSD 20 to be worn as a bracelet 21 on a variety of user wrists. In particular, the jewelry bracelet 21 is connected to the PSD 20 by the two posts 29, 30 that slide inside a channel (track 25) along the outer diameter (circumference) of the housing 22. The second post 30 is free to slide along track 25, and therefore slides back and forth along the channel (track 25) with no impediment. The second post 30 is captured and secured in place by a pivot action of the extendable knife blade 24, that hinges out from the housing 22 of the PSD 20. A first post 29 does not move freely, held in place by stabilizers 26, and stays stationary along the outer diameter of the housing 22.

A non-limiting exemplary embodiment(s), with the second post 30 free to move along the channel (track 25) when operably coupled to the housing 22, the position and size of the bracelet 21 connected to the PSD 20 is impacted, making the effective size larger and allowing the PSD 20 to “hang” in a vertical position instead of a flat position relative to the user wrist. The rubber stabilizers 26 (e.g., resilient rubber spheres) may have sphere shapes and may include nitrile butadiene rubber (NBR). Such rubber stabilizers 26 (e.g., resilient rubber spheres) are inserted into the channel before and after the first post 29 and used as friction fit stoppers to maintain a consistent position of the first post 29 along an approximately 180 degrees circumferential travel path of the housing 22. That consistent (secure) spacing allows for a consistent and predictable bracelet 21 size and a better fit experience for the user.

In a non-limiting exemplary embodiment(s), a method of using the PSD 20 preferably includes the following chronological steps: obtaining the personal security device (PSD 20) having a housing 22; opening the PSD 20, inserting a 4 mm first rubber ball 26*a* into the housing 22 and positioning it 180 degrees from an opening 48 of the housing 22; inserting a first post 29 of a bracelet 21 into the housing 22 and positioning it next to the first rubber ball 26*a*; inserting a 4 mm second rubber ball 26*b* into the housing 22 and positioning it at an opposite side of the first post 26*a* such that the first post 26*a* is intercalated between the two rubber balls 26*a*, 26*b*; inserting the second post 30 of the bracelet 21 into the housing 22 and closing the PSD 20 (top and bottom halves 22*a*, 22*b*); locking the second post 30 via the blade 24; wrapping the bracelet 21 about a cushion 60; and inserting the PSD 20 and cushion 60 into a dust cover 61.

Referring generally to FIGS. 1-13, the personal security service (PSD 20) includes a bracelet 21, a housing 22 having a mechanism 23 configured to adjustably receive and anchor the bracelet 21 configured to be worn on a user wrist, and a blade 24 being pivotally coupled to the mechanism 23 and being spaced from the bracelet 21. Advantageously, a distal end 24*a* of the blade 24 selectively and detachably locks the mechanism 23 at a desired configuration such that the bracelet 21 is securely anchored to the housing 22. Such a structural configuration yields the new, useful, and unpredicted result of being worn on the user wrist for quick and discrete size adjustment and release.

In a non-limiting exemplary embodiment, the mechanism 23 includes a circular track 25 being extended along an entire circumferential length of the housing 22, a plurality of stabilizers 26 (e.g., resilient rubber spheres) being selectively positioned along the track 25 and the circumferential length of the housing 22, and a stationary first post 29 being disposed at a fixed location along the circumferential length of the housing 22. Such a structural configuration yields the new, useful, and unpredicted result of being worn on the user wrist for quick and discrete size adjustment and release.

In a non-limiting exemplary embodiment, the mechanism 23 further includes a dynamic second post 30 being selectively disposed along the circumferential length of the housing 22 and being intercalated between the stabilizers 26 (e.g., resilient rubber spheres). Such a structural configuration yields the new, useful, and unpredicted result of being worn on the user wrist for quick and discrete size adjustment and release.

In a non-limiting exemplary embodiment, the bracelet 21 being removably attached to the stationary first post 29 and the dynamic second post 30. Such a structural configuration yields the new, useful, and unpredicted result of being worn on the user wrist for quick and discrete size adjustment and release.

In a non-limiting exemplary embodiment, the stabilizers 26 (e.g., resilient rubber spheres) include a plurality of deformably resilient members 26*a*. Such a structural configuration yields the new, useful, and unpredicted result of being worn on the user wrist for quick and discrete size adjustment and release.

In a non-limiting exemplary embodiment, the deformably resilient members 26*a* are spheric rubber balls. Such a structural configuration yields the new, useful, and unpredicted result of being worn on the user wrist for quick and discrete size adjustment and release.

In a non-limiting exemplary embodiment, the housing 22 has a bifurcated shape including a top half 22*a* and a bottom half 22*b* spaced therefrom such that the track 25 is disposed between the top half 22*a* and the bottom half 22*b*. The top half 22*a* has a plurality of top apertures 44 equidistantly spaced along a first circumference 45 thereof, and the bottom half 22*b* has a plurality of bottom apertures 46 equidistantly spaced along a second circumference 47 thereof. Advantageously, the top apertures 44 are vertically aligned with the bottom apertures 46, respectively. Advantageously, the top half 22*a* has an arcuate indentation 48 being extended radially inwardly from an outer circumferential edge of the top half 22*a*. A plurality of fasteners 49 are intercalated between the top apertures 44 and bottom apertures 46 wherein one of the fasteners 49 passes through a proximal end 24*b* of the blade 24. The housing 22 has an inner opening 50 configured to receive a user wrist therethrough. Such a structural configuration yields the new, useful, and unpredicted result of being worn on the user wrist for quick and discrete size adjustment and release.

In a non-limiting exemplary embodiment, the blade 24 has a curvilinear shape and is provided with a finger 52 being protruded orthogonally away therefrom and further being abutted against the housing 22. Such a finger 52 is rectilinear, oriented parallel to the fasteners 49, and is frictionally engaged with the arcuate indentation 48 of the top half 22*a* when the blade 24 is articulated to a closed position 53. Advantageously, the distal end of the blade 24 has a notch 54 configured to frictionally engage the dynamic second post 30 when the blade 24 is articulated to the closed position 53 such that the dynamic second post 30 is locked. Notably, the blade 24 is intercalated between the top half 22*a* and the bottom half 22*b*. Such a structural configuration yields the new, useful, and unpredicted result of being worn on the user wrist for quick and discrete size adjustment and release.

In a non-limiting exemplary embodiment, the dynamic second post 30 is slidably reciprocated along a bi-directional arcuate travel path 31 extended along the track 25 and the circumferential length of the housing 22. Such a structural configuration yields the new, useful, and unpredicted result of being worn on the user wrist for quick and discrete size adjustment and release.

In a non-limiting exemplary embodiment, the bracelet 21 is connected to both the static first post 29 and the dynamic second post 30. Such a structural configuration yields the new, useful, and unpredicted result of being worn on the user wrist for quick and discrete size adjustment and release.

In a non-limiting exemplary embodiment, the spheric rubber balls 26 (26*a*, 26*b*) are frictionally fit within the track 25 and along the circumferential length of the housing 22. Such a structural configuration yields the new, useful, and unpredicted result of being worn on the user wrist for quick and discrete size adjustment and release.

In a non-limiting exemplary embodiment, the blade 24 has a curvilinear shape and is provided with a finger 52 (mini-knife, cutting implement, etc.) being protruded orthogonally away therefrom and further being abutted against the housing 22. Such a structural configuration yields the new, useful, and unpredicted result of being worn on the user wrist for quick and discrete size adjustment and release.

In a non-limiting exemplary embodiment, the static first post 29 is diametrically opposed from the dynamic second post 30. Such a structural configuration yields the new, useful, and unpredicted result of being worn on the user wrist for quick and discrete size adjustment and release.

In a non-limiting exemplary embodiment, the static first post 29 is coextensively shaped as the dynamic second post 30. Such a structural configuration yields the new, useful, and unpredicted result of being worn on the user wrist for quick and discrete size adjustment and release.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed as new and what is desired to secure by Letters Patent of the United States is:

1. A personal security service (PSD) comprising:

a bracelet;

a housing having a mechanism configured to adjustably receive and anchor said bracelet configured to be worn on a user wrist; and a blade being pivotally coupled to said mechanism and being spaced from said bracelet;

wherein a distal end of said blade selectively and detachably locks said mechanism at a desired configuration such that said bracelet is securely anchored to said housing.

2. The PSD of claim 1, wherein said mechanism comprises:

a circular track being extended along an entire circumferential length of said housing;

a plurality of stabilizers being selectively positioned along said track and the circumferential length of said housing; and a stationary first post being disposed at a fixed location along the circumferential length of said housing.

3. The PSD of claim 2, wherein said mechanism further comprises:

a dynamic second post being selectively disposed along the circumferential length of said housing and being intercalated between said stabilizers.

4. The PSD of claim 3, wherein said bracelet is removably attached to said stationary first post and said dynamic second post.

5. The PSD of claim 3, wherein said stabilizers comprise: a plurality of deformably resilient members that are spheric rubber balls.

6. The PSD of claim 3, wherein said housing has a bifurcated shape comprising:

a top half and a bottom half spaced therefrom such that said track is disposed between said top half and said bottom half, wherein said top half has a plurality of top apertures equidistantly spaced along a first circumference thereof; wherein said bottom half has a plurality of bottom apertures equidistantly spaced along a second circumference thereof; wherein said top apertures are vertically aligned with said bottom apertures, respectively; wherein said top half has an arcuate indentation being extended radially inwardly from an outer circumferential edge of said top half; and a plurality of fasteners intercalated between said top apertures and bottom apertures;

wherein one of said fasteners passes through a proximal end of said blade;

wherein said housing has an inner opening configured to receive a user wrist therethrough.

7. The PSD of claim 6, wherein said spheric rubber balls are frictionally fit within said track and along the circumferential length of said housing.

8. The PSD of claim 6, wherein said blade has a curvilinear shape and is provided with a finger being protruded orthogonally away therefrom and further being abutted against said housing; wherein said finger is rectilinear, oriented parallel to said fasteners, and is frictionally engaged with said arcuate indentation of said top half when said blade is articulated to a closed position; wherein said distal end of said blade has a notch configured to frictionally engage said dynamic second post when said blade is articulated to the closed position such that said dynamic second post is locked; wherein said blade is intercalated between said top half and said bottom half.

9. The PSD of claim 3, wherein said dynamic second post is slidably reciprocated along a bi-directional arcuate travel path extended along said track and the circumferential length of said housing.

10. The PSD of claim 3, wherein said bracelet is connected to both said static first post and said dynamic second post.

11. The PSD of claim 3, wherein said static first post is diametrically opposed from said dynamic second post.

12. The PSD of claim 3, wherein said static first post is coextensively shaped as said dynamic second post.

13. A personal security service (PSD) comprising:

a bracelet;

a housing having a mechanism configured to adjustably receive and anchor said bracelet configured to be worn on a user wrist; and a blade being pivotally coupled to said mechanism and being spaced from said bracelet;

wherein a distal end of said blade selectively and detachably locks said mechanism at a desired configuration such that said bracelet is securely anchored to said housing;

wherein said housing has a circle shape.

14. The PSD of claim 13, wherein said mechanism comprises:

a circular track being extended along an entire circumferential length of said housing;

a plurality of stabilizers being selectively positioned along said track and the circumferential length of said housing; and a stationary first post being disposed at a fixed location along the circumferential length of said housing.

15. The PSD of claim 14, wherein said mechanism further comprises:

a dynamic second post being selectively disposed along the circumferential length of said housing and being intercalated between said stabilizers.

16. The PSD of claim 15, wherein said bracelet is removably attached to said stationary first post and said dynamic second post.

17. The PSD of claim 15, wherein said stabilizers comprise: a plurality of deformably resilient members that are spheric rubber balls.

18. The PSD of claim 15, wherein said housing has a bifurcated shape comprising:

a top half and a bottom half spaced therefrom such that said track is disposed between said top half and said bottom half; wherein said top half has a plurality of top apertures equidistantly spaced along a first circumference thereof, wherein said bottom half has a plurality of bottom apertures equidistantly spaced along a second circumference thereof, wherein said top apertures are vertically aligned with said bottom apertures, respectively; wherein said top half has an arcuate indentation being extended radially inwardly from an outer circumferential edge of said top half; and a plurality of fasteners intercalated between said top apertures and bottom apertures;

wherein one of said fasteners passes through a proximal end of said blade;

wherein said housing has an inner opening configured to receive a user wrist therethrough.

19. The PSD of claim 18, wherein said bracelet is connected to both said static first post and said dynamic second post; wherein said spheric rubber balls are frictionally fit within said track and along the circumferential length of said housing; wherein said blade has a curvilinear shape and is provided with a finger being protruded orthogonally away therefrom and further being abutted against said housing; wherein said finger is rectilinear, oriented parallel to said fasteners, and is frictionally engaged with said arcuate indentation of said top half when said blade is articulated to a closed position; wherein said distal end of said blade has a notch configured to frictionally engage said dynamic second post when said blade is articulated to the closed position such that said dynamic second post is locked; wherein said blade is intercalated between said top half and said bottom half.

20. The PSD of claim 15, wherein said dynamic second post is slidably reciprocated along a bi-directional arcuate travel path extended along said track and the circumferential length of said housing.

* * * * *